(12) United States Patent
McGregor

(10) Patent No.: US 11,391,014 B2
(45) Date of Patent: Jul. 19, 2022

(54) CONSTRUCTION VEHICLE

(71) Applicant: Caterpillar Inc., Peoria, IL (US)

(72) Inventor: Scott Andrew McGregor, Chicago, IL (US)

(73) Assignee: Caterpillar Inc., Peoria, IL (US)

( * ) Notice: Subject to any disclaimer, the term of this patent is extended or adjusted under 35 U.S.C. 154(b) by 142 days.

(21) Appl. No.: 17/001,780

(22) Filed: Aug. 25, 2020

(65) Prior Publication Data

US 2022/0064900 A1 Mar. 3, 2022

(51) Int. Cl.
*B60J 7/00* (2006.01)
*E02F 9/08* (2006.01)
*E02F 9/18* (2006.01)
*B60R 19/24* (2006.01)
*B60R 19/02* (2006.01)

(52) U.S. Cl.
CPC .......... *E02F 9/0858* (2013.01); *B60R 19/023* (2013.01); *B60R 19/24* (2013.01); *E02F 9/18* (2013.01)

(58) Field of Classification Search
CPC ............ A63B 53/0466; A63B 53/0433; A63B 53/0408; A63B 53/0412; A61M 5/44; B60B 7/20; B27G 19/02; Y10T 83/081; Y10T 83/089; B23D 59/001
See application file for complete search history.

(56) References Cited

U.S. PATENT DOCUMENTS

| | | | | |
|---|---|---|---|---|
| 3,834,478 A * | 9/1974 | Alexander | ............ | B60K 11/04 165/77 |
| 10,562,476 B2 | 2/2020 | McGregor | | |
| 2009/0038186 A1* | 2/2009 | Osswald | ................ | B60K 25/06 37/468 |
| 2009/0206589 A1* | 8/2009 | Osswald | ................ | B62D 21/14 187/234 |
| 2016/0312436 A1* | 10/2016 | Nowak | ................ | E02F 9/0841 |
| 2020/0001808 A1* | 1/2020 | McGregor | ............. | B62D 49/00 |
| 2021/0404143 A1* | 12/2021 | McGregor | ............. | E02F 3/283 |
| 2022/0064898 A1* | 3/2022 | Jackson | ................ | E02F 3/8152 |

* cited by examiner

*Primary Examiner* — Kiran B Patel

(57) ABSTRACT

A construction vehicle includes a vehicle body defining a first end and a second end. A construction vehicle also includes a guard assembly disposed proximate to the second end of the vehicle body. A construction vehicle includes a mounting assembly removably coupling the guard assembly with the vehicle body. Further, the mounting assembly includes a first mounting structure including a plurality of side plates defining a cavity and a first mounting plate coupled with the plurality of side plates. The mounting assembly also includes a second mounting structure removably coupled with the first mounting structure, the second mounting structure including a second mounting plate and a third mounting plate angularly disposed relative to the second mounting plate. Moreover, the guard assembly is in alignment with the first mounting plate and the second mounting plate for coupling the guard assembly with the mounting assembly.

20 Claims, 6 Drawing Sheets

CONSTRUCTION VEHICLE

TECHNICAL FIELD

The present disclosure relates to a construction vehicle, and more particularly, to a mounting assembly associated with the construction vehicle.

BACKGROUND

A construction vehicle, such as a wheel loader, may be used to handle materials such as asphalt, debris, rocks, and the like. Generally, a heavy guard assembly is mounted at a rear end of the construction vehicle to provide protection to one or more components of the construction vehicle. For example, the guard assembly may guard a radiator of the construction vehicle. Further, the construction vehicle also includes a counterweight disposed at the rear end. Typically, the guard assembly may be coupled to the counterweight or a bumper of the construction vehicle.

Currently, various designs of counterweights are available and different construction vehicles may include different counterweight designs. Thus, the guard assembly may have to be mounted to different counterweight designs. Mounting the guard assembly to the counterweight may be a challenging process due to lack of a mounting system or technique that allows mounting of the guard assembly with different counterweight designs.

U.S. Pat. No. 10,562,476 describes a guard assembly for a machine. The guard assembly includes a guard structure and a frame. The frame is attachable to the machine at a machine component. The guard structure is pivotably connected to the frame and movable between a first position and a second position. The frame further includes a magnet structure to releasably couple the frame to the machine component. Furthermore, the frame includes a cap is secured to the magnet structure. The cap includes a skin having at least one side extending beyond the magnet structure and contacting at least a portion of the machine component.

SUMMARY OF THE DISCLOSURE

In an aspect of the present disclosure, a construction vehicle is provided. The construction vehicle includes a vehicle body defining a first end and a second end. The construction vehicle also includes a guard assembly disposed proximate to the second end of the vehicle body. The construction vehicle further includes a mounting assembly removably coupling the guard assembly with the vehicle body. The mounting assembly includes a first mounting structure including a plurality of side plates defining a hollow cavity and a first mounting plate coupled with the plurality of side plates. The mounting assembly also includes a second mounting structure removably coupled with the first mounting structure, the second mounting structure including a second mounting plate and a third mounting plate angularly disposed relative to the second mounting plate. The guard assembly is in alignment with the first mounting plate and the second mounting plate for coupling the guard assembly with the mounting assembly.

In another aspect of the present disclosure, a wheel loader is provided. The wheel loader includes a vehicle body defining a first end and a second end. The wheel loader body includes a counterweight structure. The wheel loader also includes a guard assembly disposed proximate to the second end of the vehicle body. The wheel loader further includes a mounting assembly removably coupling the guard assembly with the counterweight structure. The mounting assembly includes a first mounting structure including a plurality of side plates defining a hollow cavity and a first mounting plate coupled with the plurality of side plates. The mounting assembly also includes a second mounting structure removably coupled with the first mounting structure, the second mounting structure including a second mounting plate and a third mounting plate angularly disposed relative to the second mounting plate. The guard assembly is in alignment with the first mounting plate and the second mounting plate for removably coupling the guard assembly with the mounting assembly.

Other features and aspects of this disclosure will be apparent from the following description and the accompanying drawings.

DETAILED DESCRIPTION

Figure 1:
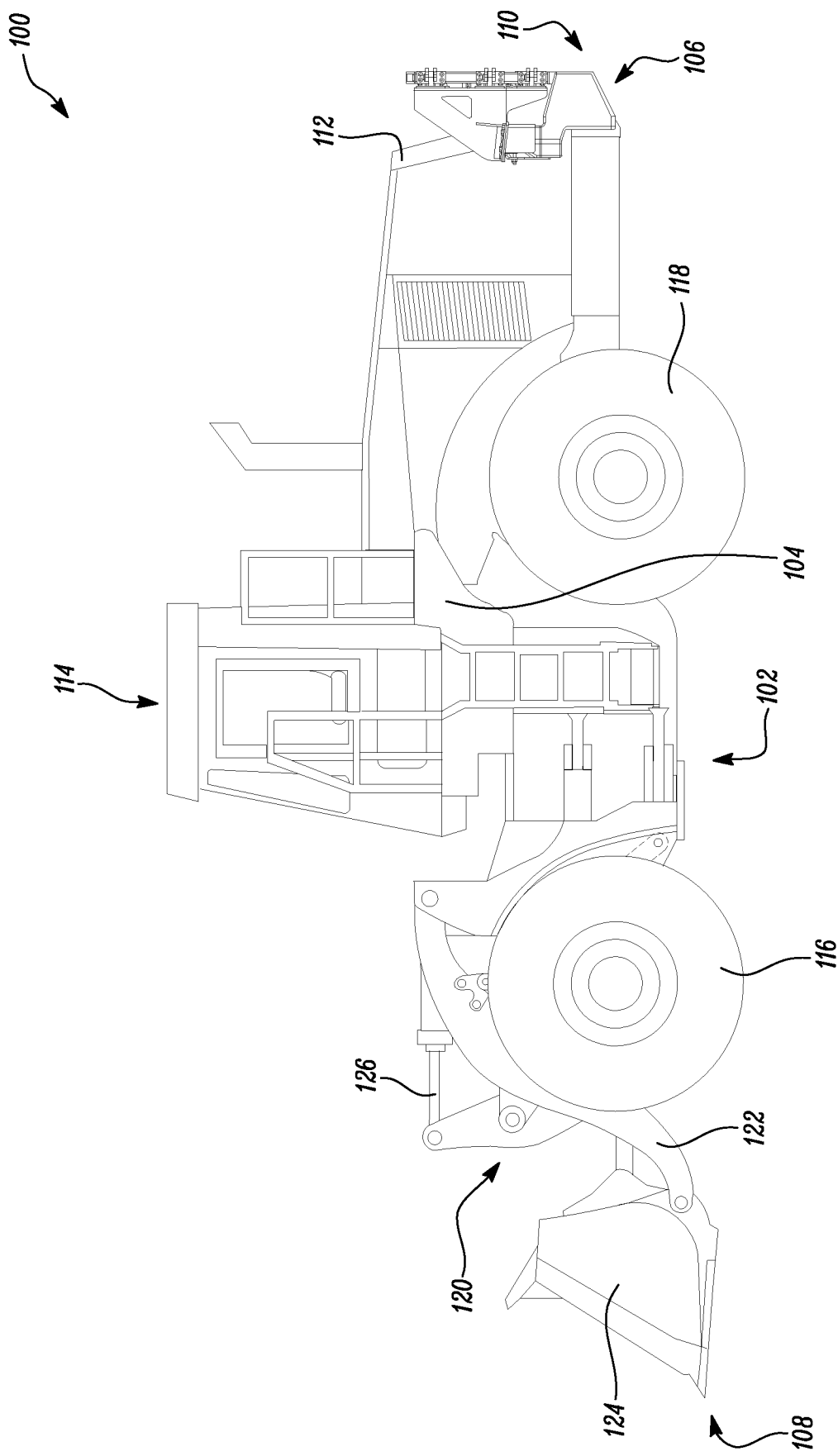
FIG. 1 is a side view of a construction vehicle, in accordance with the present disclosure.

Wherever possible, the same reference numbers will be used throughout the drawings to refer to the same or like parts. Referring to FIG. 1, a side view of an exemplary construction vehicle 100 is illustrated. The construction vehicle 100 operates at a worksite. The worksite may include a mine site, a land fill, a quarry, a construction site, and the like. The construction vehicle 100 is embodied as a wheel loader herein. The construction vehicle 100 may be hereinafter interchangeably referred to as the wheel loader 100, without limiting the scope of the present disclosure. Alternatively, the construction vehicle 100 may be embodied as off highway trucks, dozers, excavators, tractors, motor graders, scrapers, etc. that may be used in various industries to handle different types of materials.

The construction vehicle 100 includes a vehicle body 102. The vehicle body 102 may support various components of the construction vehicle 100 thereon. The vehicle body 102 includes a frame 104 and a counterweight structure 106 coupled to the frame 104. The counterweight structure 106 will be explained later in this section. The vehicle body 102 defines a first end 108 and a second end 110 opposite to the first end 108. The construction vehicle 100 includes a power source (not shown) at the second end 110 of the vehicle body 102. The power source may include an engine, such as an internal combustion engine, batteries, motors, and the like. The power source provides power to the construction vehicle 100 for operational and mobility requirements. The power source is disposed within an enclosure 112 defined by the frame 104. The construction vehicle 100 may include a cooling system (not shown) supported by the frame 104 to cool one or more components of the construction vehicle 100. The cooling system may include a radiator.

The construction vehicle 100 includes an operator cabin 114 where an operator may be seated to control an operation of the construction vehicle 100. Further, the construction vehicle 100 includes a pair of front wheels 116 and a pair of rear wheels 118 that provide support and mobility to the construction vehicle 100 on grounds. Alternatively, the construction vehicle 100 may include tracks instead of the wheels 116, 118.

The construction vehicle 100 also includes a linkage assembly 120 disposed at the first end 108 of the vehicle body 102. The linkage assembly 120 includes a pair of lifting arms 122 (only one of which is illustrated herein) movably coupled to the vehicle body 102 and an implement 124 movably coupled to the pair of lifting arms 122. The implement 124 is used to perform one or more work operations, such as loading, stock piling, dumping, and the like. The linkage assembly 120 also includes one or more hydraulic actuators 126 to facilitate movement of the linkage assembly 120.

Figure 2:
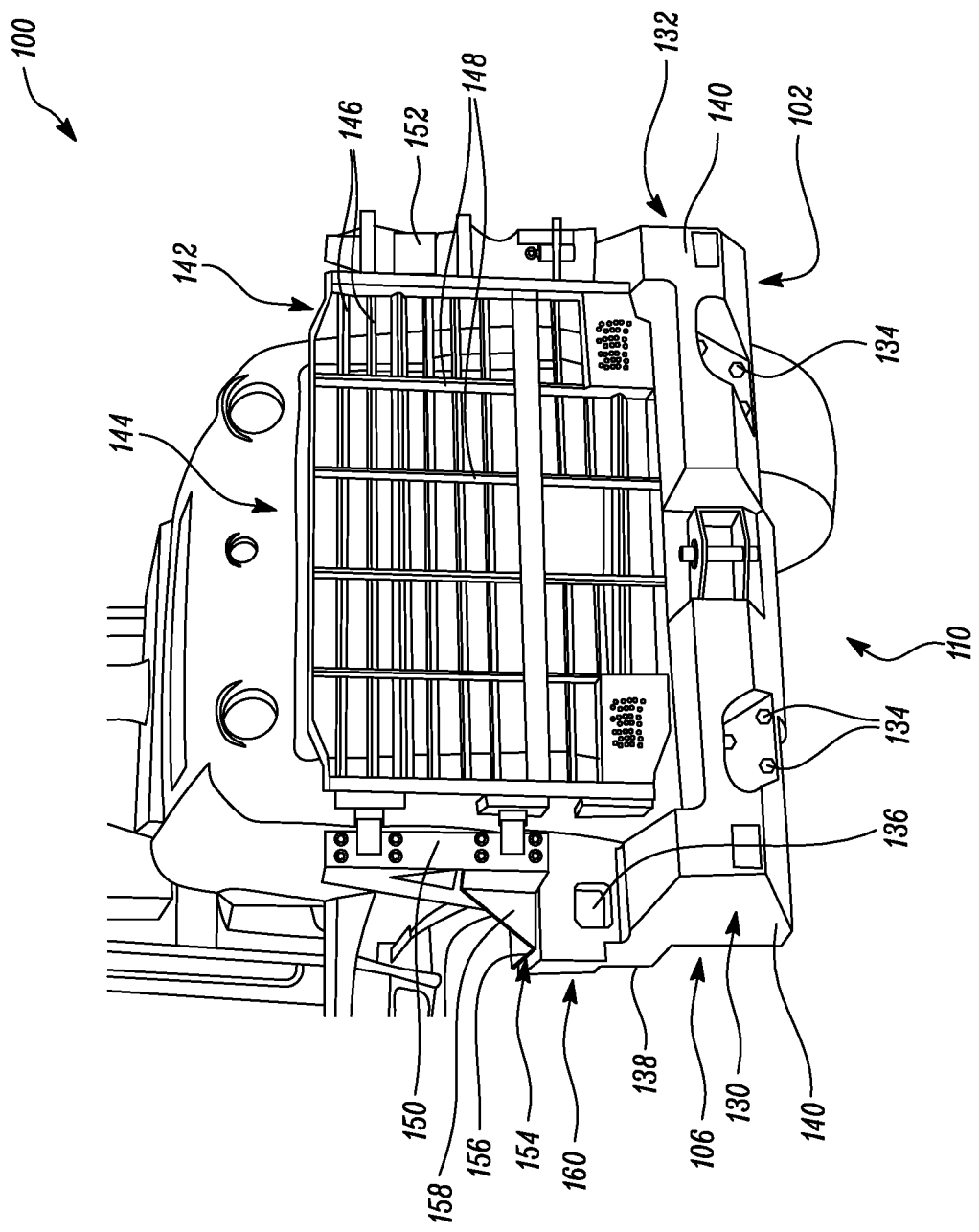
FIG. 2 is a perspective view illustrating a guard assembly and a counterweight structure of the construction vehicle of FIG. 1.

Referring to FIG. 2, the vehicle body 102 includes the counterweight structure 106. The counterweight structure 106 is positioned at the second end 110 of the construction vehicle 100 to maintain weight and balance of the construction vehicle 100. The counterweight structure 106 is generally embodied as a heavy casting of metal or alloy. In one example, the counterweight structure 106 may include a steel structure. In some embodiments, the counterweight structure 106 may be replaced by a rear bumper, without limiting the scope of the present disclosure.

As illustrated herein, the counterweight structure 106 includes a two-piece design. In an alternate embodiment, the counterweight structure 106 may include a single piece design (similar to a counterweight structure 606 explained in relation to FIG. 6), without any limitations. The counterweight structure 106 includes a first portion 130 and a second portion 132. The first and second portions 130, 132 are symmetrical to each other. The first and second portions 130, 132 of the counterweight structure 106 are coupled to the vehicle body 102 using a number of bolts 134. Each of the first and second portions 130, 132 includes a top section 136. The top section 136 includes a number of first apertures (not shown). Further, the top section 136 defines an inclined surface (not shown). Each of the first and second portions 130, 132 also include an intermediate section 138 and a base section 140. The intermediate section 138 defines a first width "W1" (shown in FIG. 5). The first width "W1" of the intermediate section 138 may vary for different profiles of the counterweight structure 106, as per application requirements. It should be noted that a design of the counterweight structure 106 illustrated herein is exemplary in nature, and the counterweight structure 106 may include any other design.

The construction vehicle 100 also includes a guard assembly 142 disposed proximate to the second end 110 of the vehicle body 102. The guard assembly 142 is positioned to guard one or more components of the construction vehicle 100, such as the radiator. The guard assembly 142 is embodied as a generally rectangular metallic structure. The guard assembly 142 includes a grid structure 144 having a number of horizontal bar members 146 and a number of vertical bar members 148. The guard assembly 142 may be made up of a material, such as, iron, aluminum, cobalt, copper, zinc, and the like, or any alloys. In an example, the guard assembly 142 may be made of stainless steel.

Further, the guard assembly 142 includes a first mounting post 150 and a second mounting post 152. Each of the first and second mounting posts 150, 152 includes a bracket member 154. The bracket members 154 define a first plate 156 and a second plate 158 generally perpendicular to the first plate 156. The first plate 156 includes a number of second apertures (not shown). It should be noted that a design of the guard assembly 142 illustrated herein is exemplary in nature, and the guard assembly 142 may include any other design.

The construction vehicle 100 further includes a mounting assembly 160 removably coupling the guard assembly 142 with the vehicle body 102. In the illustrated embodiment, the mounting assembly 160 removably couples the guard assembly 142 with the counterweight structure 106. Alternatively, the mounting assembly 160 may removably couple the guard assembly 142 with the rear bumper of the construction vehicle 100 or any other portion of the vehicle body 102.

Figure 3:
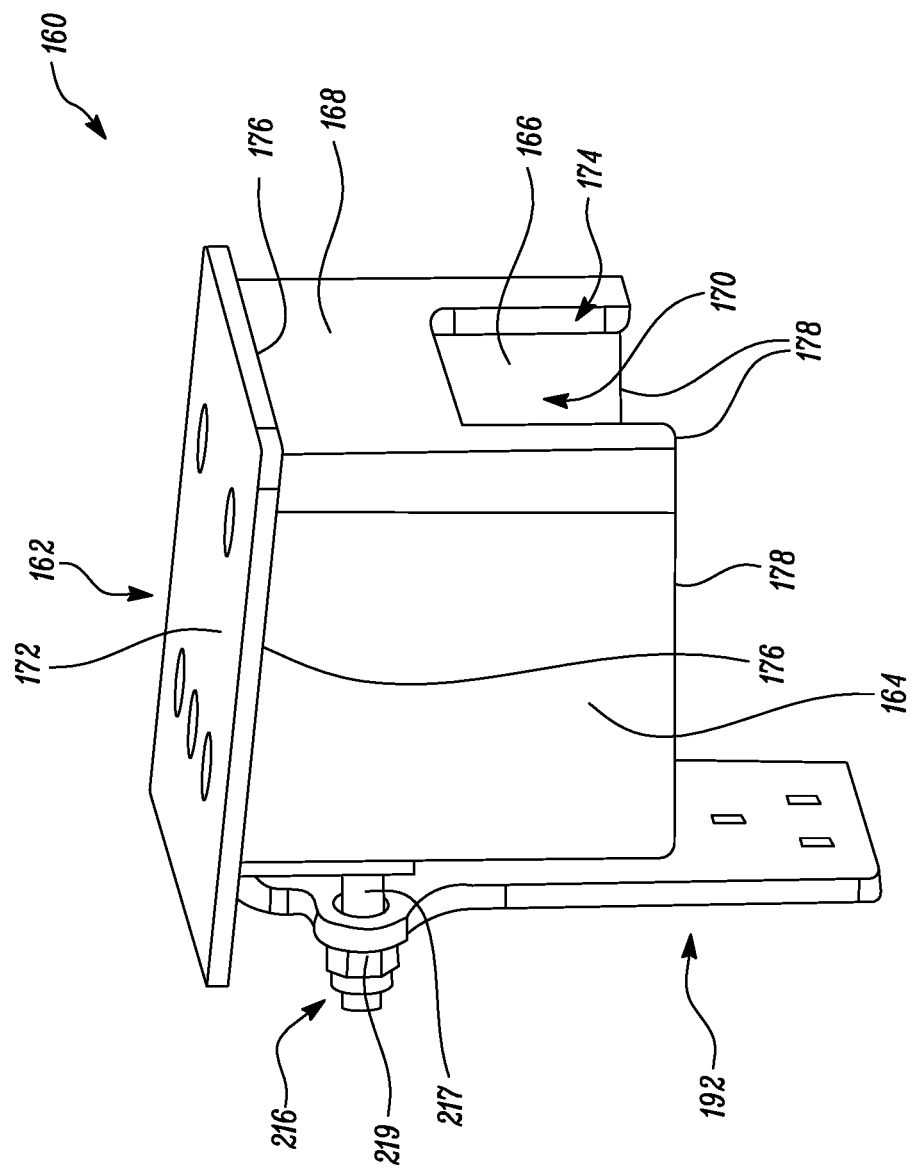
FIG. 3 is a perspective view of a mounting assembly associated with the construction vehicle of FIG. 1, in accordance with the present disclosure.

Referring to FIG. 3, the mounting assembly 160 includes a first mounting structure 162 including a number of side plates 164, 166, 168 defining a hollow cavity 170 and a first mounting plate 172 coupled with the number of side plates 164, 166, 168. The number of side plates 164, 166, 168 include the first side plate 164, the second side plate 166, and the third side plate 168. The side plates 164, 166, 168 are generally rectangular in shape. Alternatively, the side plates 164, 166, 168 may be square shaped. The counterweight structure 106 (see FIG. 2) is partially received within the hollow cavity 170 defined by the number of side plates 164, 166, 168. More particularly, the hollow cavity 170 is defined by the side plates 164, 166, 168, such that the hollow cavity 170 receives the top section 136 (see FIGS. 2 and 5) of the counterweight structure 106 when the guard assembly 142 (see FIG. 2) is coupled to the counterweight structure 106.

Further, the first and second side plates 164, 166 are generally parallel to each other. A distance "D1" (see FIG. 4) is defined between the first and second side plates 164, 166. The third side plate 168 extends between the first and second side plates 164, 166 and is generally perpendicular to the first and second side plates 164, 166. The third side plate 168 defines a slot 174. The slot 174 is provided to accommodate headlights at the top section 136 of the counterweight structure 106. Each side plate 164, 166, 168 defines a top edge 176 and a bottom edge 178. The top edges 176 of each side plate 164, 166 may be inclined relative to the corresponding bottom edges 178.

Further, the first mounting plate 172 defines a planar surface. The first mounting plate 172 is generally rectangular in shape. Alternatively, the first mounting plate 172 may be square shaped. The first mounting plate 172 is coupled to the top edges 176 of the respective side plates 164, 166, 168. Further, the first mounting plate 172 is inclined relative to the bottom edges 178 of each side plate 164, 166. It should be noted that, in some examples, an inclination of the first mounting plate 172 may be substantially equal to an inclination of the inclined surface of the top section 136 of the counterweight structure 106.

Figure 4:
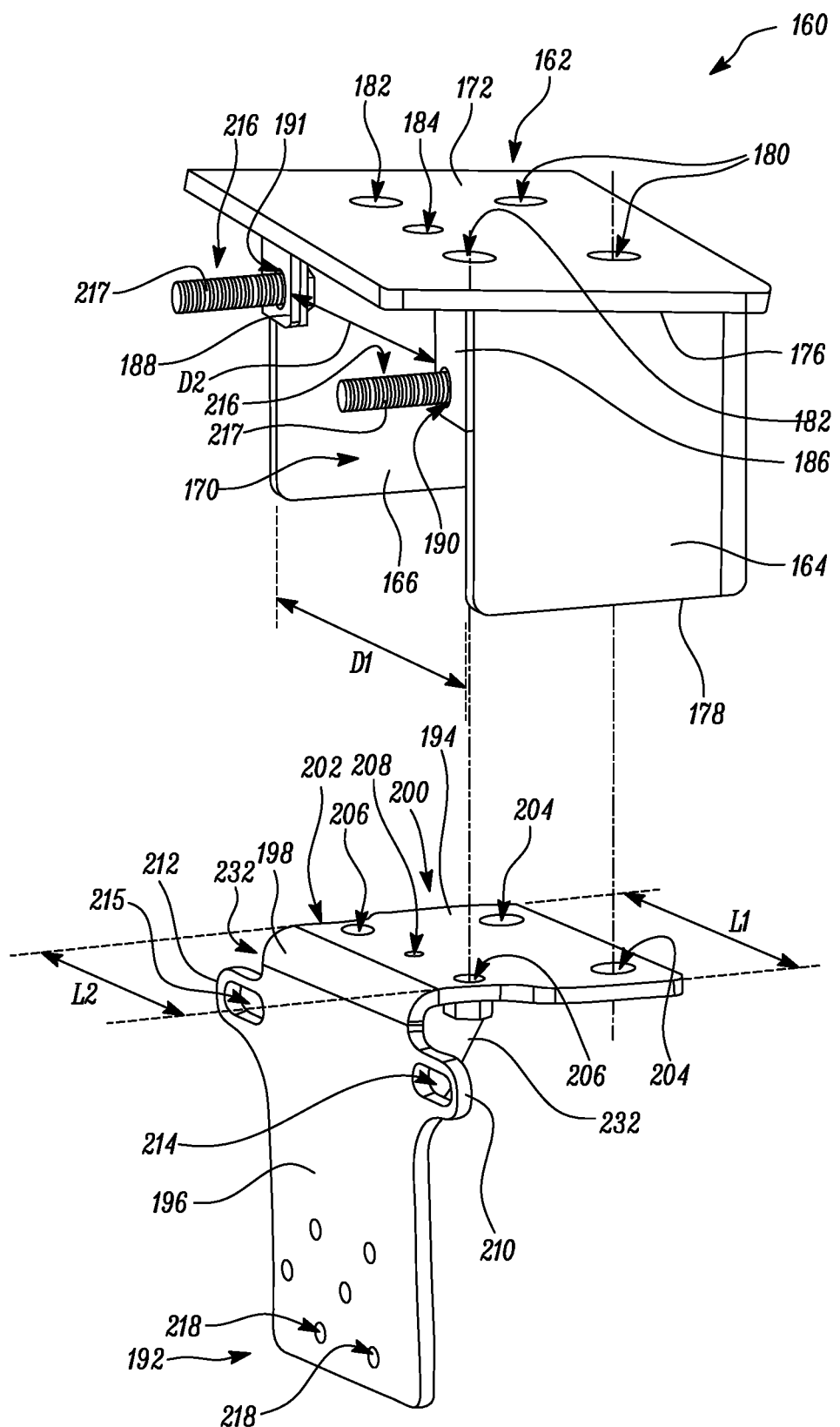
FIG. 4 is an exploded view of the mounting assembly of FIG. 3.

Referring to FIG. 4, the first mounting structure 162 includes a number of first slots 180 and a number of second slots 182. More particularly, the first mounting plate 172 includes two first slots 180 and two second slots 182. However, a total number of the first and second slots 180, 182 may vary, as per requirements. Further, the first mounting plate 172 also includes a centrally located slot 184 disposed between the second slots 182. The first slots 180, the second slots 182, and the slot 184 are oblong in shape.

The first mounting structure 162 also includes a pair of side members 186, 188. The side member 186 is connected to the first side plate 164 and the first mounting plate 172, whereas the side member 188 is connected to the second side plate 166 and the first mounting plate 172. Each side member 186, 188 defines a first through-aperture 190, 191. Further, a distance "D2" is defined between the side members 186, 188.

The mounting assembly 160 further includes a second mounting structure 192 removably coupled with the first mounting structure 162. The second mounting structure 192 includes a second mounting plate 194 and a third mounting plate 196 angularly disposed relative to the second mounting plate 194. The second mounting plate 194 is connected to the third mounting plate 196 by a curved portion 198.

The second mounting plate 194 is received within the hollow cavity 170 defined by the number of side plates 164, 166, 168. Further, in an assembled condition of the mounting assembly 160, the second mounting plate 194 is substantially parallel to the first mounting plate 172 and is in contact with the first mounting plate 172. The second mounting plate 194 defines a first section 200 and a second section 202. As illustrated, the first and second sections 200, 202 are generally rectangular in shape. A length "L1" of the first section 200 is substantially equal to the distance "D1" between the first and second side plates 164, 166. Further, the length "L1" of the first section 200 is greater than the distance "D2" between the side members 186, 188. Moreover, a length "L2" of the second section 202 is substantially equal to the distance "D2" between the side members 186, 188.

Further, the first section 200 includes a number of third slots 204 and the second section 202 includes a number of fourth slots 206. In the illustrated embodiment, the first section 200 includes two third slots 204 and the second section 202 includes two fourth slots 206. However, a total number of the third and fourth slots 204, 206 may vary, as per application requirements. The second section 202 also includes a centrally located slot 208 disposed between the fourth slots 206. The third slots 204, the fourth slots 206, and the slot 208 are oblong in shape. When the second mounting plate 194 is received within the hollow cavity 170, the third slots 204 are in alignment with the first slots 180, the fourth slots 206 are in alignment with the second slots 182, and the slot 208 is in alignment with the slot 184.

Further, the third mounting plate 196 is generally rectangular in shape. The third mounting plate 196 includes a first curved section 210 and a second curved section 212. Further, the third mounting plate 196 defines a pair of openings 214, 215. More particularly, the first opening 214 is defined in the first curved section 210 and the second opening 215 is defined in the second curved section 212. Each of the pair of openings 214, 215 is in alignment with the first through-apertures 190, 191 of a corresponding side member 186, 188 of the pair of side members 186, 188 for receiving a first mechanical fastener 216. More particularly, the first opening 214 is in alignment with the first through-aperture 190 in the side member 186 and the second opening 215 is in alignment with the first through-aperture 191 in the side member 188. In this embodiment, the openings 214, 215 are oblong in shape. In other embodiments, the openings 214, 215 may have a circular shape, a rectangular shape, and the like. Further, in the illustrated embodiment, the first mechanical fastener 216 includes a bolt 217 and a locknut 219. Alternatively, the bolts 217 may be replaced by screws, pins, and the like. Further, the third mounting plate 196 includes a number of second through-holes 218. More particularly, the third mounting plate 196 includes five second through-holes 218. However, a total number of the second through-holes 218 may vary, as per application requirements.

Figure 5:
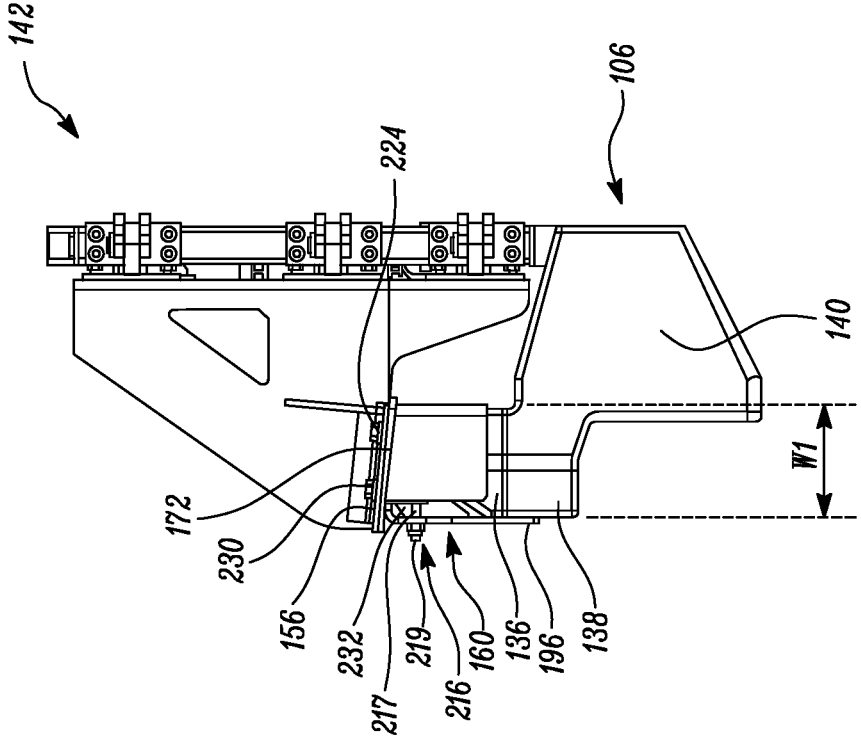
FIG. 5 is a side view illustrating the guard assembly and the counterweight structure coupled to the mounting assembly of FIG. 3.

FIG. 5 illustrates the mounting assembly 160 coupled with the guard assembly 142 and the counterweight structure 106. The guard assembly 142 is in alignment with the first mounting plate 172 and the second mounting plate 194 (shown in FIG. 4) for coupling the guard assembly 142 with the mounting assembly 160. More particularly, for coupling the guard assembly 142 with the mounting assembly 160, each second aperture in the guard assembly 142 aligns with the corresponding second slots 182 (see FIG. 3) in the first mounting plate 172 and the corresponding fourth slots 206 (see FIG. 3) in the second mounting plate 194 (see FIG. 4) to receive a second mechanical fastener 230. Accordingly, the guard assembly 142 is coupled with the first mounting plate 172 and the second mounting plate 194 by the number of the second mechanical fasteners 230. The mounting assembly 160 includes two second mechanical fasteners 230. In the illustrated embodiment, the second mechanical fasteners 230 are embodied as bolts. Alternatively, the second mechanical fasteners 230 may be embodied as screws, pins, and the like.

Further, the counterweight structure 106 is in alignment with the second mounting plate 194 and the first mounting plate 172 for coupling the guard assembly 142 with the counterweight structure 106. More particularly, for coupling the counterweight structure 106 with the mounting assembly 160, each first aperture in the counterweight structure 106 aligns with the corresponding third slots 204 (see FIG. 3) in the second mounting plate 194 and the corresponding first slots 180 (see FIG. 3) in the first mounting plate 172 to receive a third mechanical fastener 224. Accordingly, the counterweight structure 106 is coupled with the second mounting plate 194 and the first mounting plate 172 by the number of third mechanical fasteners 224. In the illustrated embodiment, the third mechanical fasteners 224 are embodied as bolts. Alternatively, the third mechanical fasteners 224 may be embodied as screws, pins, and the like. Moreover, the second mounting structure 192 includes a plate 232. One end of the plate 232 is connected to the second mounting plate 194 and another end of the plate 232 is connected to the third mounting plate 196.

Further, when the counterweight structure 106 is coupled with the mounting assembly 160, the inclined surface of the top section 136 of the counterweight structure 106, the first mounting plate 172, and the second mounting plate 194 are substantially parallel to each other. Moreover, for coupling the guard assembly 142 with the counterweight structure 106, the locknuts 219 of the first mechanical fasteners 216 are tightened to eliminate any gap between the third mounting plate 196 and the counterweight structure 106. In some examples, the third mounting plate 196 is in contact with the intermediate section 138 of the counterweight structure 106 when the locknuts 219 are tightened.

In an embodiment, the mounting assembly 160 is made of stainless steel. In other embodiments, the mounting assembly 160 may be made of a material such as aluminum, nickel, copper, zinc, or any other alloy, without any limitations.

Figure 6:
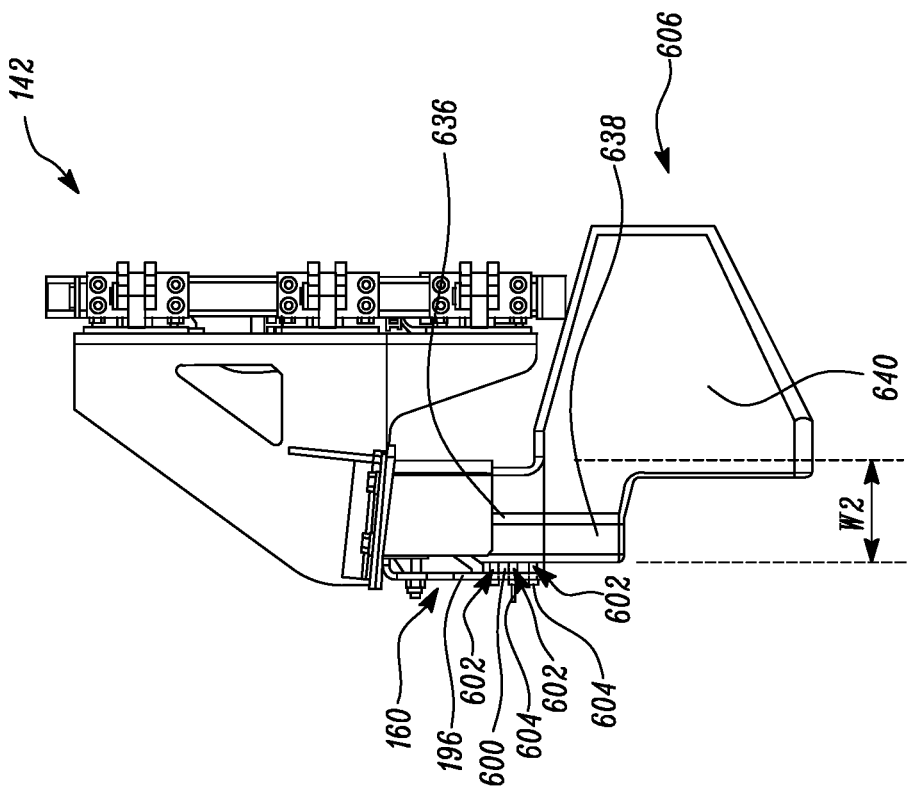
FIG. 6 is a side view of the mounting assembly and a plate member of the mounting assembly, in accordance with the present disclosure.

FIG. 6 illustrates another embodiment of the present disclosure. In this embodiment, the construction vehicle 100 (see FIG. 1) includes a counterweight structure 606 having a single piece design. In an alternate embodiment, the counterweight structure 106 may include a two-piece design (similar to the counterweight structure 106 explained in relation to FIGS. 1 to 5), without any limitations. The counterweight structure 606 defines a pair of top sections 636, a pair of intermediate sections 638, and a pair of base sections 640. The top, intermediate, and base sections 636, 638, 640 are substantially similar in design to the top, intermediate, and base sections 136, 138, 140 of the counterweight structure 106 described in relation to FIG. 2. Further, the intermediate section 638 defines a second width "W2". The second width "W2" is lesser than the first width "W1" (see FIG. 5) of the intermediate section 138 of the counterweight structure 106. Accordingly, in order to bridge a gap between the third mounting plate 196 and the counterweight structure 606, the mounting assembly 160 includes a plate member 600.

As illustrated in the accompanying figure, the mounting assembly 160 (described in relation to FIGS. 3 and 4) couples the guard assembly 142 with the counterweight structure 606. The mounting assembly 160 includes the plate member 600 removably coupled with the third mounting plate 196 such that the plate member 600 is disposed between the third mounting plate 196 and the counterweight structure 606. More particularly, when the counterweight structure 606 is coupled with the mounting assembly 160, the plate member 600 is in contact with the third mounting plate 196 and the intermediate section 638. The plate member 600 is made up of stainless steel. In other embodiments, the plate member 600 may be made up of iron, aluminum, cobalt, copper, zinc, brass, bronze, and the like. The plate member 600 is rectangular in shape. In some examples, a width of the plate member 600 may be substantially equal to a distance between the third mounting plate 196 and the counterweight structure 606.

The plate member 600 includes a number of third through-holes 602. More particularly, the plate member 600 includes five third through-holes 602. Each third through-hole 602 is embodied as a threaded through-hole herein. Further, each third through-hole 602 aligns with corresponding second through-holes 218 (see FIG. 4) in the third mounting plate 196 for receiving a fourth mechanical fastener 604. Accordingly, the plate member 600 is coupled with the second mounting plate by the number of fourth mechanical fasteners 604. In the illustrated embodiment, the mounting assembly 160 includes five fourth mechanical fasteners 604. The fourth mechanical fasteners 604 are embodied as bolts. Alternatively, the fourth mechanical fasteners 604 may be embodied as screws, pins, and the like.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure relates to the mounting assembly 160 for coupling the guard assembly 142 to various counterweight structures 106, 606. For explanatory purposes, this section will be explained in relation to the embodiment explained in FIGS. 1 to 5. However, the details provided below are equally application to the embodiment, explained in FIG. 6, without any limitations.

The mounting assembly 160 described herein includes a modular design and provides a simple, robust, and flexible coupling between the guard assembly 142 and the counterweight structure 106 of the construction vehicle 100. The mounting assembly 160 allows assembly of the guard assembly 142 with the counterweight structure 106 without any major modifications to the guard assembly 142 or the counterweight structure 106. The mounting assembly 160 includes the first mounting plate 172 that presents the planar surface upon which the guard assembly 142 is mounted.

The mounting assembly 160 allows transfer of forces from the guard assembly 142 to the counterweight structure 106, via the mounting assembly 160. More particularly, the mounting assembly 160 supports the guard assembly 142 by creating a reactionary load throughout the counterweight structure 106 when impacted. Thus, the mechanical fasteners 216, 224, 230 do not exclusively hold the reactionary force, but such forces are distributed as reactionary forces across the counterweight structure 106. This further provides a stable and robust mounting provision for the guard assembly 142 to the counterweight structure 106. Moreover, the locknuts 219 pull the first and second mounting structures 162, 192 together, thereby eliminating any gaps that may present between the third mounting plate 196 and the counterweight structure 106.

The mounting assembly 160 may include a spacer or shim (such as the plate member 600) to accommodate multiple sizes and designs of the counterweight structures 106. More particularly, the mounting assembly 160 can be coupled with the counterweight structure 106 having different first widths "W1". Thus, the mounting assembly 160 may be used to couple the guard assembly 142 to the counterweight structure 106 having different profiles. The plate member 600 eliminates any gaps which may exist after the assembly of the mounting assembly 160 with the guard assembly 142 and the counterweight structure 106, thereby providing strength/firmness to the attachment.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A construction vehicle comprising:
    a vehicle body defining a first end and a second end;
    a guard assembly disposed proximate to the second end of the vehicle body; and
    a mounting assembly removably coupling the guard assembly with the vehicle body, wherein the mounting assembly includes:
        a first mounting structure including a plurality of side plates defining a hollow cavity and a first mounting plate coupled with the plurality of side plates; and
        a second mounting structure removably coupled with the first mounting structure, the second mounting structure including a second mounting plate and a third mounting plate angularly disposed relative to the second mounting plate, wherein the guard assembly is in alignment with the first mounting plate and the second mounting plate for coupling the guard assembly with the mounting assembly.

2. The construction vehicle of claim 1, wherein the second mounting plate is received within the hollow cavity defined by the plurality of side plates.

3. The construction vehicle of claim 1, wherein the first mounting structure includes a pair of side members, each side member defining a first through-aperture.

4. The construction vehicle of claim 3, wherein the third mounting plate defines a pair of openings, such that each of the pair of openings is in alignment with the first through-aperture of a corresponding side member of the pair of side members for receiving a first mechanical fastener.

5. The construction vehicle of claim 1, wherein the guard assembly is coupled with the first mounting plate and the second mounting plate by a plurality of second mechanical fasteners.

6. The construction vehicle of claim 1, wherein the vehicle body includes a counterweight structure, and wherein the mounting assembly removably couples the guard assembly with the counterweight structure.

7. The construction vehicle of claim 6, wherein the counterweight structure is at least partially received within the hollow cavity defined by the plurality of side plates.

8. The construction vehicle of claim 6, wherein the counterweight structure is in alignment with the second mounting plate and the first mounting plate for coupling the guard assembly with the counterweight structure.

9. The construction vehicle of claim 8, wherein the counterweight structure is coupled with the second mounting plate and the first mounting plate by a plurality of third mechanical fasteners.

10. The construction vehicle of claim 6, wherein the mounting assembly includes a plate member removably coupled with the third mounting plate such that the plate member is disposed between the third mounting plate and the counterweight structure.

11. The construction vehicle of claim 10, wherein the plate member is coupled with the third mounting plate by a plurality of fourth mechanical fasteners.

12. A wheel loader comprising:
   a vehicle body defining a first end and a second end, wherein the vehicle body includes a counterweight structure;
   a guard assembly disposed proximate to the second end of the vehicle body; and
   a mounting assembly removably coupling the guard assembly with the counterweight structure, wherein the mounting assembly includes:
      a first mounting structure including a plurality of side plates defining a hollow cavity and a first mounting plate coupled with the plurality of side plates; and
      a second mounting structure removably coupled with the first mounting structure, the second mounting structure including a second mounting plate and a third mounting plate angularly disposed relative to the second mounting plate, wherein the guard assembly is in alignment with the first mounting plate and the second mounting plate for removably coupling the guard assembly with the mounting assembly.

13. The wheel loader of claim 12, wherein the second mounting plate is received within the hollow cavity defined by the plurality of side plates.

14. The wheel loader of claim 12, wherein the first mounting structure includes a pair of side members, each side member defining a first through-aperture.

15. The wheel loader of claim 14, wherein the third mounting plate defines a pair of openings, such that each of the pair of openings is in alignment with the first through-aperture of a corresponding side member of the pair of side members for receiving a first mechanical fastener.

16. The wheel loader of claim 12, wherein the guard assembly is coupled with the first mounting plate and the second mounting plate by a plurality of second mechanical fasteners.

17. The wheel loader of claim 12, wherein the counterweight structure is at least partially received within the hollow cavity defined by the plurality of side plates.

18. The wheel loader of claim 12, wherein the counterweight structure is in alignment with the second mounting plate and the first mounting plate for coupling the guard assembly with the counterweight structure.

19. The wheel loader of claim 18, wherein the counterweight structure is coupled with the second mounting plate and the first mounting plate by a plurality of third mechanical fasteners.

20. The wheel loader of claim 12, wherein the mounting assembly includes a plate member removably coupled with the third mounting plate such that the plate member is disposed between the third mounting plate and the counterweight structure.

* * * * *